United States Patent
Reichelt et al.

(12) 
(10) Patent No.: US 6,495,652 B1
(45) Date of Patent: Dec. 17, 2002

(54) PREPOLYMERS CONTAINING ISOCYANATE GROUPS AND A METHOD FOR THE PRODUCTION THEREOF

(75) Inventors: Michael Reichelt, Ruhland (DE); Udo Rotermund, Ortrand (DE); Renate Hempel, Ruhland (DE); Peter Falke, Schwarzheide (DE); Peter von Malotki, Cosel (DE); Holger Seifert, Hüde (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/673,046

(22) PCT Filed: May 10, 1999

(86) PCT No.: PCT/EP99/03195

§ 371 (c)(1),
(2), (4) Date: Oct. 9, 2000

(87) PCT Pub. No.: WO99/61501

PCT Pub. Date: Dec. 2, 1999

(30) Foreign Application Priority Data

May 26, 1998 (DE) .......................... 198 23 393

(51) Int. Cl.⁷ .................. C08G 18/76; C08G 18/10; C08J 9/04; C07C 269/02; C07C 271/28
(52) U.S. Cl. .............. 528/59; 252/182.2; 252/182.21; 252/182.22; 521/159; 521/174; 521/175; 528/67; 528/77; 528/85; 560/25; 560/26; 560/330; 560/359
(58) Field of Search .............. 252/182.2, 182.21, 252/182.22; 521/159, 174, 175; 528/59.67, 77, 85; 560/25, 26, 330, 359

(56) References Cited

U.S. PATENT DOCUMENTS

| | | | |
|---|---|---|---|
| 3,963,679 A | 6/1976 | Ullrich et al. | 264/211 |
| 4,031,026 A | 6/1977 | Ibbotson | 252/182 |
| 4,250,292 A | 2/1981 | Niederdellmann et al. | 528/44 |
| 4,792,575 A | 12/1988 | Takao et al. | 521/157 |
| 4,972,004 A | 11/1990 | Randall et al. | 521/159 |
| 5,114,989 A | 5/1992 | Elwell et al. | 521/159 |
| 5,164,422 A | 11/1992 | Londrigan et al. | 521/159 |
| 5,426,126 A | 6/1995 | Gebauer et al. | 521/131 |
| 5,470,515 A | 11/1995 | Grimm et al. | 264/255 |
| 5,908,913 A | 6/1999 | Orthmann et al. | 528/49 |

FOREIGN PATENT DOCUMENTS

| | | |
|---|---|---|
| CA | 2146388 | 10/1995 |
| DE | 2302564 | 7/1974 |
| DE | 2842806 | 4/1980 |
| DE | 4118362 | 12/1992 |
| DE | 4202972 | 8/1993 |
| DE | 19752037 | 5/1999 |
| EP | 320134 | 6/1989 |
| EP | 392788 | 10/1990 |
| EP | 480588 | 4/1992 |
| EP | 543536 | 5/1993 |
| EP | 550901 A2 | 7/1993 |
| EP | 676434 | 10/1995 |
| EP | 722962 | 7/1996 |
| GB | 1444192 | 7/1976 |
| GB | 1450660 | 9/1976 |
| SU | 876657 | 10/1981 |
| WO | WO93/08224 | 4/1993 |
| WO | WO94/29361 | 12/1994 |
| WO | WO98/34973 | 8/1998 |

OTHER PUBLICATIONS

Derwent Abstract of SU 876657.
Derwent Abstract of DE 19752037.

Primary Examiner—Rabon Sergent
(74) Attorney, Agent, or Firm—Fernando A. Borrego

(57) ABSTRACT

Prepolymers which contain isocyanate groups, have an NCO content of at least 30.0% by weight and can be prepared by reacting an isocyanate mixture consisting predominantly of diphenylmethane diisocyanates and polyphenylpolymethylene polyisocyanates and having a proportion of two-ring isomers of not more than 74% by weight with at least 4-functional polyols or a mixture of polyols having a mean functionality of at least 4, where the polyols or polyol mixtures have a hydroxyl number of from 200 to 1650 mg KOH/g and a number average molecular weight of less than 1100 g/mol. The present invention also provides a process for preparing these prepolymers containing isocyanate groups, provides for their use for producing polyurethanes and provides a process for producing polyurethanes by reacting at least one novel prepolymer containing isocyanate groups, if desired in admixture with further organic and/or modified organic isocyanates (a), with compounds having at least two reactive hydrogen atoms (b) in the presence of, if desired, blowing agents (c), catalysts (d) and, if desired, further auxiliaries and/or additives (e).

14 Claims, No Drawings

PREPOLYMERS CONTAINING ISOCYANATE GROUPS AND A METHOD FOR THE PRODUCTION THEREOF

The present invention relates to novel prepolymers containing isocyanate groups, a process for their preparation by reacting an isocyanate mixture consisting predominantly of diphenylmethane diisocyanates and polyphenylpolymethylene polyisocyanates with polyols or a mixture of polyols and the use of these prepolymers for producing polyurethanes, in particular polyurethane foams.

The production of polyurethanes, including polyurethane foams, by reacting organic polyisocyanates and/or modified organic polyisocyanates or prepolymers with higher-functionality compounds containing at least two reactive hydrogen atoms, for example polyoxyalkylenepolyamines and/or preferably organic polyhydroxyl compounds, in particular polyetherols having molecular weights of, for example, from 200 to 6000, and, if desired, chain extenders and/or crosslinkers having molecular weights of up to about 400 in the presence of catalysts, blowing agents, auxiliaries and/or additives is known and has been described many times. A summary overview of this is given, for example, in the Kunststoff-Handbuch, Volume VII, "Polyurethane", 1st Edition 1966, edited by Dr. R. Vieweg and Dr. A. Höchtlen, and 2nd Edition 1983 and 3rd Edition 1993, edited by Dr. G. Oertel (Carl Hanser Verlag, Munich, Vienna).

The chemical structures which are formed from the polyisocyanates and are present here can be polyurethanes, polyureas, polyisocyanurates and also further isocyanate adducts such as allophanates, biurets, carbodiimides and the isocyanate adducts, oxazolidones, polyimides, polyamides, etc. The type of these structures is controlled by means of the compounds which are reacted with the isocyanates, the catalysis and the reaction conditions. These isocyanate adducts are generally summarized under the term polyurethanes since the polyurethanes are the most important and most frequent of the polyisocyanate adducts.

The preparation of NCO prepolymers has also been described in numerous documents, for example in the abovementioned Kunststoff-Handbuch.

For foam production, it is useful if the foam bodies can be quickly removed from the mold immediately after their production. This applies both to removal from a mold in batchwise foam production and to the continuous production of foams, for example using the double conveyor belt method. It is important that the demolding itself takes place without crack formation and/or the foam can, as a result of correspondingly good curing, be subjected as quickly as possible after the synthesis to mechanical treatment, e.g. a sawing step, without crack formation or other destructive occurrences. The foams should have a fine-celled structure. In addition, the flow behavior of the reacting mixture of isocyanate and hydrogen-active materials is of particular importance for foam formation. This flow behavior is, as is known, influenced by the viscosity of the components and thus also of the isocyanate components. A low viscosity of the isocyanate component is necessary for good flow. The required better curing with low crack formation can be achieved in a known manner by, for example, use of a relatively high-viscosity isocyanate having a low proportion of diphenylmethane diisocyanates and a relatively high proportion of polyphenylpolymethylene polyisocyanates. This does not meet the requirement of reducing crack formation at a given constant viscosity of the isocyanate component, i.e. improving the curing immediately after foam formation.

EP-A-0 543 536 describes the production of foams in the presence of a liquid which is largely insoluble in the reaction mixture and is present as an emulsion or microemulsion. This emulsion is said to lead to a more fine-celled structure of the foam. Isocyanate components described for this specific purpose are, apart from customary mixtures of diphenylmethane diisocyanates with polyphenylpolymethylene polyisocyanates, also prepolymers derived from these mixtures and a bifunctional, isocyanate-reactive component in a range from 1 to 150 millimol of urethane/100 g.

WO 93/08224 describes a polyisocyanate composition as a mixture of from 30 to 85% by weight of NCO prepolymer, up to 50% by weight of polyphenylpolymethylene polyisocyanates and up to 40% by weight of diphenylmethane diisocyanates. The advantage indicated is an improved miscibility with rigid foam polyols. For this purpose, considerable parts of the NCO groups are reacted with polyols having a molecular weight from 11,000 g/mol upward, so that NCO contents of the prepolymer far below 30% by weight, in preferred examples from 18.1 to 19.8% by weight, are always obtained. These prepolymers give cells which are still too large in the rigid foam and lead to unsatisfactory curing.

DE-A-4118362 describes the production of pipe insulation via rigid foam having an external compact polyurethane covering layer. Among other things, NCO prepolymers derived from diphenylmethane diisocyanates containing up to 30% by weight of polyphenylpolymethylene polyisocyanates and having an NCO content of the prepolymers of from 5 to 20% by weight are also used.

U.S. Pat. No. 5,164,422 describes the production of polyisocyanurate foams using prepolymers derived from polymeric diphenylmethane diisocyanates and polyester alcohols having a functionality of significantly below 4.

EP-A-0 392 788 discloses a prepolymer derived from diphenylmethane diisocyanates for the production of purely water-blown foams; this prepolymer has an NCO content of from 2 to 12% by weight of NCO. The viscosity is too high for normal foam processing, namely 38,000 mPas in a preferred example.

EP-A-0 320 134 describes prepolymers derived from diphenylmethane diisocyanates and polyols having a functionality of significantly below 4 as constituents of a mixture with diphenylmethane diisocyanates and polyphenylpolymethylene polyisocyanates for producing rigid foam.

AU 8767-425 describes the use of prepolymers derived from a mixture of from 45 to 95% by weight of diphenylmethane diisocyanates and from 5 to 55% by weight of polyphenylpolymethylene polyisocyanates and polyester polyols having a mean functionality of significantly less than 4, the prepolymers having an NCO content of significantly less than 30% by weight for producing flexible foam having excellent adhesion to PVC.

SU 876 657 describes the use of a prepolymer derived from a mixture of from 75 to 65 parts of diphenylmethane diisocyanates with from 25 to 35 parts of polyphenylpolymethylene polyisocyanates and triols for integral rigid foam.

NL 7605 286 describes the use of a prepolymer derived from diphenylmethane diisocyanates in admixture with their uretoneimines and diols.

DT 2513 793 and DT 2513 796 describe the use of a prepolymer derived from a mixture of from 55 to 85 parts of diphenylmethane diisocyanates with polyphenylpolymethylene polyisocyanates and diols.

In EP-A-0 550 901, isocyanates of the diphenylmethane series having a proportion of from 75 to 95% by weight of two-ring isomers with a proportion of 2,4'-isomers of from 15 to 40% by weight and of 2,2'-isomers of from 2 to 10% by weight and also a proportion of from 5 to 25% by weight of polymeric isocyanates of the diphenylmethane series are reacted with polyether polyols having a functionality of from 3 to 8, and an OH number of from 350 to 1000 mg KOH/g and a molecular weight of from 150 to 1000 g/mol. The main object of this invention is the preparation of light-colored isocyanate components from which particularly light-colored rigid polyurethane foams can then be produced.

In WO 94/29361 prepolymers having NCO contents of from 5 to 10% by weight are produced by reacting isocyanates with polyols at from 40 to 80° C., with the reaction being carried out conventionally, i.e. in a reaction vessel suitable for this purpose.

U.S. Pat. No. 5,114,989 discloses, for example, MDI prepolymers which are reacted with polyols rich in ethylene oxide. It is stated here that the metered addition of polyol to the initial charge of isocyanate in the reactor has to be carried out so that a temperature in the range from 45 to 90° C. is maintained or not exceeded.

DE-A-4202972 describes a continuous preparation of a prepolymer using a special mixing nozzle. In actual fact mixing is achieved by means of a mixing head of a polyurethane foaming machine. This continuous reaction takes place in a separate unit.

EP-A-0 480 588 and EP-A-0 722 962 describe a continuous production of isocyanate prepolymers where an existing foaming plant is, when the foaming plant is down, utilized as far as the mixing head for continuously metering the components for the preparation of the prepolymers. During this time, the entire foaming plant cannot be used for its actual purpose, which has to be seen as a disadvantage.

Experiments on producing prepolymers continuously in a reaction extruder have been described (DE-A-2842806).

DE-A-2302564 discloses special mixing nozzles which are supposed to produce intimate mixing of the components and such a mixing head for the continuous preparation of prepolymers.

A continuous preparation in which the two reactants are fed via a static mixer into a prepolymer preparation unit has likewise been disclosed (DE-A-2823762).

All reported prepolymers based on mixtures of diphenylmethane diisocyanates with polyphenylpolymethylene polyisocyanates are, compared to mixtures of diphenylmethane diisocyanates with polyphenylpolymethylene polyisocyanates which have not been prepolymerized and have the same viscosity, not suitable for effecting improved curing with reduced crack formation and a fine-celled structure of the foams produced therefrom.

It is an object of the present invention to develop a prepolymer based on mixtures of diphenylmethane diisocyanates with polyphenylpolymethylene polyisocyanates which effects improved curing with reduced crack formation and a fine-celled structure of foams produced therefrom.

We have found, surprisingly, that this object is achieved by reacting an isocyanate mixture consisting predominantly of diphenylmethane diisocyanates and polyphenylpolymethylene polyisocyanates and having a proportion two-ring isomers of not more than 74% by weight with at least 4-functional polyols or a mixture of polyols having a mean functionality of at least 4, where the polyols or polyol mixtures have a hydroxyl number of from 200 to 1650 mg KOH/g and a number average molecular weight of less than 1100 g/mol and the prepolymer containing isocyanate groups has an NCO content of at least 30.0% by weight.

The present invention accordingly provides prepolymers which contain isocyanate groups, have an NCO content of at least 30.0% by weight and can be prepared by reacting an isocyanate mixture consisting predominantly of diphenylmethane diisocyanates and polyphenylpolymethylene polyisocyanates and having a proportion of two-ring isomers of not more than 74% by weight with at least 4-functional polyols or a mixture of polyols having a mean functionality of at least 4, where the polyols or polyol mixtures have a hydroxyl number of from 200 to 1650 mg KOH/g and a number average molecular weight of less than 1100 g/mol.

The present invention also provides a process for preparing these prepolymers containing isocyanate groups, provides for their use for producing polyurethanes and provides a process for producing polyurethanes by reacting at least one novel prepolymer containing isocyanate groups, if desired in admixture with further organic and/or modified organic isocyanates (a), with compounds having at least two reactive hydrogen atoms (b) in the presence of, if desired, blowing agents (c), catalysts (d) and, if desired, further auxiliaries and/or additives (e).

In our studies we have surprisingly found that fine-celled foams having improved curing and low crack formation can be produced using the prepolymers of the present invention. It would have been expected that these prepolymers would, because of their comparatively low content of isocyanate addition products, not give significantly different foam properties than the isocyanate mixtures which have not been prepolymerized.

It was also surprising that no property differences are found when the prepolymers are produced in the isocyanate process stream compared to a conventional preparation in a specific reaction vessel. Owing to the different residence time distributions of batchwise and continuous processes, different prepolymer properties would have been expected.

The use of the process variants of the present invention enables a prepolymer to be produced inexpensively without additional reaction vessels.

To prepare the prepolymers containing isocyanate groups, use is made of at least 4-functional polyols or a mixture of polyols having a mean functionality of at least 4, where the polyols or polyol mixtures have a hydroxyl number of from 200 to 1650 mg KOH/g, preferably from 300 to 1000 mg KOH/g, and a number average molecular weight of less than 1100 g/mol, preferably from 280 to 1000 g/mol.

At least 4-functional polyols are, for example, polyether alcohols based on high-functionality initiator molecules such as pentaerythritol or sugar alcohols, e.g. hexitols, preferably sorbitol, or sugars including polymeric forms such as starch and cellulose. Such initiator molecules are described, for example, in Lehrbuch der organischen Chemie by H. Beyer, 8th Edition 1961, published by S. Hirzel Verlag Leipzig, pages 281 to 314. Preference is given to using adducts of hexitols, in particular sorbitol, and sugars, in particular sucrose, and alkylene oxides, in particular ethylene oxide and propylene oxide.

Additions of polyols, preferably polyether alcohols or polyester alcohols, having a functionality of less than 4 are also possible provided that the conditions specified according to the present invention are adhered to. These polyols are described in more detail further below under the discussion of component (b).

It is particularly advantageous for the polyol used to be a polyetherol, in particular a reaction product of sorbitol, propylene oxide and traces of water having a hydroxyl number of from 200 to 800 mg KOH/g.

The polyols or polyol mixtures are advantageously used in an amount of from 0.1 to 5% by weight, in particular from 0.5 to 3% by weight, based on the total weight of the prepolymer.

To prepare the prepolymers containing isocyanate groups, use is made of isocyanate mixtures consisting predominantly of dimethylmethane diisocyanates and polyphenylpolymethylene polyisocyanates and having a proportion of two-ring isomers of not more than 74% by weight, preferably from 25 to 70% by weight and in particular from 28 to 55% by weight. The isocyanate mixture can further comprise the by-products usual in its preparation, normally in an amount of up to 10% by weight.

Apart from the isocyanate mixtures described, it is also possible to use further organic and/or modified organic polyisocyanates for preparing the prepolymers of the present invention. Suitable polyisocyanates are the aliphatic, cycloaliphatic, araliphatic and preferably aromatic polyfunctional isocyanates known per se, as are described further below under the discussion of component (a). If further organic and/or modified organic polyisocyanates are used, they are preferably added in an amount of up to 50% by weight.

The polyol is preferably metered in such a way that a reaction temperature of from 20 to 100° C., preferably from 70 to 90° C., is ensured for the formation of the prepolymers containing urethane groups.

In a preferred embodiment, the reaction to form the prepolymer is carried out by metering the polyols or the polyol mixture directly into the process stream and/or the isocyanate container of the isocyanate-producing plant.

The polyol species to be reacted is metered continuously or discontinuously into the isocyanate stream or into the isocyanate container of an isocyanate production plant.

If the preparation of the prepolymer is carried out directly in an isocyanate production plant, any further organic and/or modified organic polyisocyanates used can be metered into the process stream in addition to the polyols or polyol mixtures. However, it is also possible to mix these into the prepolymer after its preparation.

All components which are metered in have to be mixed in well.

In a preferred embodiment of the continuous preparation, the polyols or the polyol mixture are metered, in particular continuously, by a static mixer or a similar suitable mixing device into the isocyanate stream. The metering rate and the metering temperature are selected such that rapid reaction of the polyols metered in can be ensured without the reaction going out of control as a result of hot spots occurring. This type of metering dispenses with the otherwise customary heating processes for prepolymer preparation. It is also possible to introduce the polyol via a static mixer into the storage tank for the isocyanates which the products reach at a relatively high entry temperature. The prepolymer can be fully reacted during the homogenization process.

In a preferred embodiment of the batchwise preparation, the isocyanate or isocyanate mixture is placed in a stirred vessel, if desired heated to from 30 to 80° C., and the polyol is added while stirring. To complete the reaction, stirring is continued for from 0.5 to 2 hours at from 30 to 80° C. and the prepolymer is dispensed into a storage container or the container for despatch.

The novel prepolymers containing isocyanate groups have an NCO content of at least 30.0% by weight, preferably from 30 to 32% by weight. The viscosity range at 25° C. is usually from 100 to 5000 mPas.

The prepolymers/modified polyisocyanates can, if desired, be mixed with one another or with unmodified organic polyisocyanates such as diphenylmethane 2,4'- and/or 4,4'-diisocyanate, crude MDI, tolylene 2,4- and/or 2,6-diisocyanate.

The novel prepolymers containing isocyanate groups are very useful for producing polyurethanes. They are processed to form polyurethane foams in particular, but also to produce non-cellular polyurethanes.

The polyurethanes are produced by reacting, in a known manner, at least one prepolymer containing isocyanate groups and prepared according to the present invention, if desired in admixture with further organic and/or modified organic isocyanates (a), with compounds containing at least two reactive hydrogen atoms (b) in the presence of, if desired, blowing agents (c), catalysts (d) and, if desired, further auxiliaries and/or additives (d).

As regards the individual starting components, the following may be said by way of example:

Suitable organic and/or modified organic polyisocyanates (a) for preparing both the prepolymers of the present invention (isocyanates used concomitantly) and the polyurethanes (isocyanates used concomitantly) are the aliphatic, cycloaliphatic, araliphatic and preferably aromatic polyfunctional isocyanates known per se.

Specific examples are: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate, cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates such as tolylene 2,4- and 2,6-diisocyanate (-TDI) and the corresponding isomer mixtures, diphenylmethane 4,4'-, 2,4'- and 2,2'-diisocyanate (-MDI) and the corresponding isomer mixtures, mixtures of 4,4'- and 2,2'-MDI, polyphenylpolymethylene polyisocyanates, mixtures of 4,4'-, 2,4'- and 2,2'-MDI and polyphenylpolymethylene polyisocyanates (crude MDI) and mixtures of crude MDI and TDI. The organic diisocyanates and polyisocyanates can be used individually or in the form of any mixtures.

Use is frequently also made of modified polyfunctional isocyanates, i.e. products which are obtained by chemical reaction of organic diisocyanates and/or polyisocyanates. Examples which may be mentioned are diisocyanates and/or polyisocyanates containing ester, urea, biuret, allophanate, carbodiimide, isocyanurate, uretdione and/or urethane groups.

Specific examples are: organic, preferably aromatic, polyisocyanates containing urethane groups, having NCO contents of from 47 to 5% by weight, preferably from 40 to 15% by weight, based on the total weight, and obtained, for example, by reaction with low molecular weight diols, triols, dialkylene glycols, trialkylene glycols or polyoxyalkylene glycols having molecular weights of up to 6000, in particular having molecular weights of up to 1500, modified 4,4'-MDI, modified 4,4'- and 2,4'-MDI mixtures, modified crude MDI or 2,4- or 2,6-TDI, where dialkylene glycols or polyoxyalkylene glycols which can be used individually or as mixtures are, for example: diethylene glycol, dipropylene glycol, polyoxyethylene, polyoxypropylene and polyoxypropylene-polyoxyethylene glycols, triols and/or tetrols.

Other modified polyisocyanates which have been found to be useful are liquid polyisocyanates containing carbodiimide groups and/or isocyanurate rings and having NCO contents of from 47 to 5% by weight, preferably from 40 to 15% by weight, based on the total weight, e.g. based on 4,4'-, 2,4'- and/or 2,2'-MDI and/or 2,4- and/or 2,6-TDI.

The modified polyisocyanates can be mixed with one another or with unmodified organic polyisocyanates such as 2,4'-, 4,4'-MDI, crude MDI, 2,4- and/or 2,6-TDI.

Organic and/or modified organic polyisocyanates (a) which have been found to be particularly useful and are therefore preferably employed are: mixtures of TDI isomers and crude MDI or mixtures of modified organic polyisocyanates containing urethane groups and having an NCO content of from 47 to 5% by weight, in particular those based on TDI isomers, 4,4'-MDI, MDI isomer mixtures or crude MDI and particularly crude MDI having an MDI isomer content of from 30 to 80% by weight, preferably from 30 to 55% by weight.

As compounds containing at least two reactive hydrogen atoms (b), use is advantageously made of those having a functionality of from 2 to 4, preferably from 2 to 3, and a molecular weight of from 300 to 8000, preferably from 300 to 5000. Examples of compounds which have been found to be useful are polyetherpolyamines and/or preferably polyols selected from the group consisting of polyether polyols, polyester polyols, polythioether polyols, polyester amides, hydroxyl-containing polyacetals and hydroxyl-containing aliphatic polycarbonates or mixtures of at least two of the polyols mentioned. Preference is given to using polyester polyols and/or polyether polyols. The hydroxyl number of the polyhydroxyl compounds is generally from 20 to 80 mg KOH/g and preferably from 28 to 56 mg KOH/g.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives, e.g. dicarboxylic esters of alcohols having from 1 to 4 carbon atoms or dicarboxylic anhydrides. Preference is given to using dicarboxylic acid mixtures of succinic, glutaric and adipic acid in weight ratios of, for example, 20–35:35–50:20–32 parts by weight, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. It is also possible to use polyester polyols derived from lactones, e.g. $\epsilon$-caprolactone, or hydroxycarboxylic acids, e.g. $\omega$-hydroxycaproic acid. To prepare the polyester polyols, the organic, e.g. aromatic and preferably aliphatic, polycarboxylic acids and/or derivatives and polyhydric alcohols can be polycondensed in the absence of catalysts or preferably in the presence of esterification catalysts, advantageously in an atmosphere of inert gas such as nitrogen, carbon monoxide, helium, argon, etc., in the melt at from 150 to 250° C., preferably from 180 to 220° C., under atmospheric pressure or reduced pressure, to the desired acid number which is advantageously less than 10, preferably less than 2. According to a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distill off the water of condensation. To prepare the polyester polyols, the organic polycarboxylic acids and/or derivatives and polyhydric alcohols are advantageously polycondensed in a molar ratio of 1:1–1.8, preferably 1:1.05–1.2.

The polyester polyols obtained preferably have a functionality of from 2 to 4, in particular from 2 to 3, and a molecular weight of from 480 to 3000, in particular from 600 to 2000.

However, the relatively high molecular weight compounds containing at least two reactive hydrogen atoms which are used are particularly preferably polyether polyols which can be prepared by known methods, for example from one or more alkylene oxides having from 2 to 4 carbon atoms in the alkylene radical by anionic polymerization using alkali metal hydroxides such as sodium or potassium hydroxide, or alkali metal alkoxides such as sodium methoxide, sodium or potassium ethoxide or potassium isopropoxide, as catalysts with addition of at least one initiator molecule containing from 2 to 4, preferably from 2 to 3, reactive hydrogen atoms in bound form, or by cationic polymerization using Lewis acids such as antimony pentachloride, boron fluoride etherate, etc., or bleaching earth as catalysts. Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Examples of suitable initiator molecules are: water, organic dicarboxylic acids such as succinic acid, adipic acid, phthalic acid and terephthalic acid, aliphatic and aromatic, unalkylated, N-monoalkylated or N,N- and N,N'-dialkylated diamines having from 1 to 4 carbon atoms in the alkyl radical, e.g. unalkylated, monoalkylated or dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-tolylenediamine and 4,4'-, 2,4'- and 2,2'-diaminodiphenylmethane. Further suitable initiator molecules are: alkanolamines such as ethanolamine, N-methylethanolamine and N-ethylethanolamine, dialkanolamines such as diethanolamine, N-methyldiethanolamine and N-ethyldiethanolamine and trialkanolamines such as triethanolamine, and ammonia. Preference is given to using polyhydric, in particular dihydric and/or trihydric alcohols such as ethanediol, 1,2- and 2,3-propanediol, diethylene glycol, dipropylene glycol, 1,4-butanediol, 1,6-hexanediol, glycerol, trimethylolpropane and pentaerythritol, while for rigid foam polyetherols relatively high-functionality initiators such as sorbitol and sucrose are predominantly employed.

The polyether polyols, preferably polyoxypropylene polyols and polyoxypropylene-polyoxyethylene polyols, have a functionality of preferably from 2 to 4 and in particular from 2 to 3 and molecular weights of from 300 to 8000, preferably from 300 to 6000 and in particular from 1000 to 5000, and suitable polyoxytetramethylene glycols have a molecule weight of up to about 3500, while for rigid foam polyetherols, molecular weights of from 300 to 1000 are usual.

Further suitable polyether polyols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, e.g. in a weight ratio of from 90:10 to 10:90, preferably from 70:30 to 30:70, advantageously in the abovementioned polyether polyols using methods similar to those given in German patents 1111394, 1222669 (U.S. Pat. Nos. 3,304, 273, 3,383,351, 3,523,093), 1152536 (GB 1040452) and 1152537 (GB 987618), and also polyether polyol dispersions which comprise as disperse phase, usually in an amount of from 1 to 50% by weight, preferably from 2 to 25% by weight: e.g. polyureas, polyhydrazides, polyurethanes containing bound tertiary amino groups and/or melamine and are described, for example, in EP-B-011752 (U.S. Pat. No. 4,304,708), U.S. Pat. No. 4,374,209 and DE-A-3231497.

Like the polyester polyols, the polyether polyols can be used individually or in the form of mixtures. They can also be mixed with the graft polyether polyols or polyester polyols or with the hydroxy-containing polyesteramides, polyacetals, polycarbonates and/or polyetherpolyamines.

Suitable hydroxyl-containing polyacetals, likewise relatively high molecular weight compounds containing at least two reactive hydrogen atoms, are, for example, the compounds which can be prepared from glycols such as diethylene glycol, triethylene glycol, 4,4'-dihydroxyethoxydiphenyldimethylmethane or hexanediol and formaldehyde. Suitable polyacetals can also be prepared by polymerization of cyclic acetals.

Suitable hydroxyl-containing polycarbonates are those of the type known per se which can be prepared, for example, by reacting diols such as 1,3-propanediol, 1,4-butanediol and/or 1,6-hexanediol, diethylene glycol, triethylene glycol or tetraethylene glycol with diaryl carbonates, e.g. diphenyl carbonate, or phosgene.

The polyester amides as relatively high molecular weight compounds containing at least two reactive hydrogen atoms include, for example, the predominantly linear condensates obtained from polybasic, saturated and/or unsaturated carboxylic acids or their anhydrides and polyfunctional saturated and/or unsaturated aminoalcohols or mixtures of polyfunctional alcohols and aminoalcohols and/or polyamines.

Suitable polyetherpolyamines as relatively high molecular weight compounds containing at least two reactive hydrogen atoms can be prepared from the abovementioned polyetherpolyols by known methods. Examples which may be mentioned are the cyanoalkylation of polyoxyalkylene polyols and subsequent hydrogenation of the nitrile formed (U.S. Pat. No. 3,267,050) or the partial or complete amination of polyoxyalkylene polyols with amines or ammonia in the presence of hydrogen and catalysts (DE 1215373).

Preference is given to using polyester polyols and/or polyether polyols. The hydroxyl number of the polyhydroxyl compounds is generally from 20 to 1590 mg KOH/g for use in flexible foams and preferably from 20 to 200 for rigid foams. However, it is also possible to use mixtures of polyols for producing flexible or rigid foams. In this case, both for rigid and for flexible foams, it is possible to use not only polyols within the specified hydroxyl number range but also those having a hydroxyl number outside the range.

The polyurethanes can be produced with or without use of chain extenders and/or crosslinkers. However, the addition of chain extenders, crosslinkers or, if desired, mixtures thereof can prove to be advantageous for modifying the mechanical properties, e.g. the hardness. Chain extenders and/or crosslinkers used are diols and/or triols having molecular weights of less than 400, preferably from 60 to 300. Suitable chain extenders/crosslinkers are, for example, aliphatic, cycloaliphatic and/or araliphatic diols having from 2 to 14, preferably from 4 to 10, carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4-, 1,3, 5-trihydroxycyclohexane, glycerol and trimethylolpropane, and low molecular weight hydroxyl-containing polyalkylene oxides based on ethylene oxide and/or 1,2-propylene oxide and the abovementioned diols and/or triols as initiator molecules. The boundary between chain extenders and polymeric polyols is fluid. An adduct of ethanediol and ethylene oxide is, for example, both a low polymer, also known as an oligomer, and a chain extender.

If chain extenders, crosslinkers or mixtures thereof are employed for producing the polyurethanes, in particular foams based on isocyanate, they are advantageously used in an amount of from 0 to 20% by weight, preferably from 1 to 8% by weight, based on the weight of the polyol compound.

Blowing agents (c) used for producing foams based on isocyanate can be the chlorofluorocarbons (CFCs), hydrocarbons consisting of hydrogen, carbon, chlorine and fluorine (HCFCs), hydrocarbons consisting of hydrogen, carbon and fluorine (HFCs) and perfluorinated hydrocarbons generally known from polyurethane chemistry. However, the use of CFCs and HCFCs and also the perfluorinated hydrocarbons is being greatly restricted or completely stopped for ecological reasons. Apart from the HCFCs and HFCs, alternative blowing agents are, in particular, aliphatic and/or cycloaliphatic hydrocarbons, especially pentane and cyclopentane, or acetals such as methylal, and also tetramethylsilane.

These physical blowing agents are usually added to the polyol component of the system. However, they can also be added to the isocyanate component or, as a combination, both to the polyol component and to the isocyanate component. It is also possible to use them together with highly fluorinated and/or perfluorinated hydrocarbons in the form of an emulsion of the polyol component. If emulsifiers are employed, it is usual to use oligomeric acrylates which contain bound polyoxyalkylene and fluoroalkane radicals as side groups and have a fluorine content of from about 5 to 30% by weight. Such products are sufficiently well known from plastics chemistry, e.g. EP-A-351614.

The amount of blowing agent or blowing agent mixture used is from 1 to 25% by weight, preferably from 1 to 15% by weight, in each case based on the polyol component (b).

Furthermore, it is possible and customary to add water as blowing agent to the formative component (b) in an amount of from 0.5 to 15% by weight, preferably from 1 to 5% by weight, based on the formative component (b). The addition of water can be combined with the use of the other blowing agents described.

As catalysts (d) for producing the polyurethanes, use is made, in particular, of compounds which strongly accelerate the reaction of the compounds containing reactive hydrogen atoms, in particular hydroxyl groups, of component (b) with the novel prepolymers containing isocyanate groups and any further organic, modified or unmodified polyisocyanates (a). Suitable catalysts are organic metal compounds, preferably organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate. The organic metal compounds are used alone or preferably in combination with strongly basic amines. Examples which may be mentioned are amidines such as 2,3-dimethyl-3,4,5,6-tetrahydropyrimidine, tertiary amines such as triethylamine, tributylamine, trimethylcyclohexylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis(dimethylaminoethyl) ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyldiethanolamine and N-ethyldiethanolamine and dimethylethanolamine. Further suitable catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali alkoxides such as sodium methoxide and potassium isopropoxide, and also alkali metal salts of long-chain fatty acids having from 10 to 20 carbon atoms and possibly lateral OH groups. Preference is given to using from 0.001 to 5% by weight, in particular from 0.05 to 2% by weight, of catalyst or catalyst combination, based on the weight of the formative component (b).

The reaction of the isocyanate groups with one another, e.g. to form isocyanurate groups, is, if necessary, additionally catalyzed in a known manner, e.g. using potassium acetate, potassium octoate, quaternary ammonium salts or triazines or pentamethyldiethylenetriamine.

If desired, further auxiliaries and/or additives (e) can be incorporated into the reaction mixture for producing the polyurethane foams. Examples which may be mentioned are surface-active substances, foam stabilizers, cell regulators, fillers, dyes, pigments, flame retardants, hydrolysis inhibitors, fungistatic and bacteriostatic substances.

Suitable surface-active substances are, for example, compounds which serve to aid the homogenization of the starting materials and may also be suitable for regulating the cell structure of the plastics. Examples which may be mentioned are emulsifiers such as the sodium salts of castor oil sulfates or fatty acids and also amine salts of fatty acids, e.g. diethylamine oleate, diethanolamine stearate, diethanolamine ricinoleate, salts of sulfonic acids, e.g. alkali metal or ammonium salts of dodecylbenzene- or dinaphthylmethanedisulfonic acid and ricinoleic acid, foam stabilizers such as siloxane-oxyalkylene copolymers and other organopolysiloxanes, ethoxylated alkylphenols, ethoxylated fatty alcohols, paraffin oils, castor oil or ricinoleic esters, Turkey red oil and peanut oil, and cell regulators such as paraffins, fatty alcohols and dimethylpolysiloxanes. The above-described oliogmeric acrylates having polyoxyalkylene and fluoroalkane radicals as side groups are also suitable for improving the emulsifying action, the cell structure and/or stabilizing the foam. The surface-active substances are usually employed in amounts of from 0.01 to 5 parts by weight, based on 100 parts by weight of the formative component (b).

For the purposes of the present invention, fillers, in particular reinforcing fillers, are the customary organic and inorganic fillers, reinforcing materials, weighting agents, agents for improving the abrasion behavior in paints, coatings, etc., known per se. Specific examples are: inorganic fillers such as siliceous minerals, for example sheet silicates such as antigorite, serpentine, hornblends, amphiboles, chrysotile and talc, metal oxides such as kaolin, aluminum oxides, titanium oxides and iron oxides, metal salts such as chalk and barite, and inorganic pigments such as cadmium sulfide, zinc sulfide, and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various lengths which may, if desired, be coated with a size. Examples of suitable organic fillers are: carbon, melamine, rosin, cyclopentadienyl resins and graft polymers and also cellulose fibers, polyamide, polyacrylonitrile, polyurethane, polyester fibers based on aromatic and/or aliphatic dicarboxylic esters and, in particular, carbon fibers. The inorganic and organic fillers can be used individually or as mixtures and are advantageously incorporated into the reaction mixture in amounts of from 0.5 to 50% by weight, preferably from 1 to 40% by weight, based on the weight of the components (a) and (b), but the contents of matts, nonwovens and woven fabrics of natural and synthetic fibers may reach values of up to 80% by weight.

Suitable flame retardants are, for example, tricresyl phosphate, tris(2-chloroethyl) phosphate, tris(2-chloropropyl) phosphate, tetrakis(2-chloroethyl) ethylene diphosphate, dimethyl methanephosphonate, diethyl diethanolaminomethylphosphonate and also commercial halogen-containing flame retardant polyols. Apart from the abovementioned halogen-substituted phosphates, it is also possible to use is inorganic or organic flame retardants such as red phosphorus, hydrated aluminum oxide, antimony trioxide, arsenic oxide, ammonium polyphosphate and calcium sulfate, expandable graphite or cyanuric acid derivatives, such as melamine, or mixtures of at least two flame retardants, e.g. ammonium polyphosphates and melamine and, if desired, maize starch or ammonium polyphosphate, melamine and expandable graphite and/or aliphatic or aromatic polyesters, for making the polyisocyanate polyaddition products flame resistant. In general, it has been found to be useful to use from 5 to 50 parts by weight, preferably from 5 to 25 parts by weight, of the flame retardants mentioned per 100 parts by weight of the formative component (b).

Further details regarding the abovementioned other customary auxiliaries and additives may be found in the specialist literature, for example the monograph by J. H. Saunders and K. C. Frisch "High Polymers" Volume XVI, Polyurethanes, Parts 1 and 2, Interscience Publishers 1962 and 1964, or the Kunststoffhandbuch, Polyurethane, Volume VII, Hanser-Verlag Munich, Vienna, 1st, 2nd and 3rd Editions, 1966, 1983 and 1993.

To produce the polyurethanes, in particular the foams based on isocyanate, the NCO prepolymers of the present invention or their mixtures with other isocyanates (a), compounds containing at least two reactive hydrogen atoms (b) are reacted in such amounts that the equivalence ratio of NCO groups of the prepolymers and polyisocyanates (a) to the sum of the reactive hydrogen atoms of components (b) is 0.80–5:1, preferably 0.90–1.5:1 for polyurethanes and from 1.5:1 to 5:1 for polyurethane/polyisocyanurates.

The polyurethanes, in particular foams based on isocyanates, are advantageously produced by the one-shot method, for example using the high-pressure or low-pressure technique in open or closed molds, for example metal molds. The continuous application of the reaction mixture to suitable conveyor belts for producing foam blocks, sheets or sandwich elements is also customary.

It has been found to be particularly advantageous to employ the two-component process and to combine the formative components (b), (d) and, if desired (c) and (e) as component (A) and to use the NCO prepolymers or mixtures of these prepolymers and further polyisocyanates (a) and, if desired, blowing agents (c) as component (B).

The starting components are mixed at from 15 to 90° C., preferably from 20 to 60° C. and in particular from 20 to 35° C., and introduced into the open mold or under atmospheric or superatmospheric pressure into the close mold or, in the case of a continuous workstation, applied to a belt which accommodates the reaction mixture. Mixing can be carried out mechanically by means of a stirrer, by means of a stirring screw or by high-pressure mixing in a nozzle. The mold temperature is advantageously from 20 to 110° C., preferably from 30 to 60° C. and in particular from 35 to 55° C.

The isocyanate-based foams produced by the process of the present invention have a density of from 10 to 800 kg/m$^3$, preferably from 30 to 500 kg/m$^3$ and in particular from 30 to 70 kg/m$^3$. In addition to the urethane groups, they may also contain isocyanurate, urea, biuret, allophanate, oxazolidone, polyimide, polyamide and carbodiimide groups and adducts of the carbodiimide groups with NCO groups.

The foams produced in this particular way are suitable, for example, as rigid foam for thermal insulation in, for example, refrigerators, long-distance heating systems, heat banks, sandwich elements, insulation boards, etc., and also as flexible foam for upholstery purposes in the furniture and automotive industries and as a constituent in integral foam systems.

The prepolymers of the present invention can, however, also be used for producing non-cellular polyurethanes, e.g. pourable resins, adhesives or sealing compositions.

The present invention is illustrated by the examples below, without being restricted thereby.

EXAMPLE 1 COMPARISON

The A component, a mixture of (parts=parts by mass):

| | |
|---|---|
| 41.5 parts | of a polyetherol based on sucrose, glycerol, water and propylene oxide, OH number 400 mg KOH/g (Lupranol ® 3321, BASF), |
| 15 parts | of a polyetherol based on sucrose, glycerol, water and propylene oxide, OH number 490 mg KOH/g (Lupranol ® 3423, BASF), |
| 22 parts | of trichloropropyl phosphate, |
| 10 parts | of flame retardant based on halogen and phosphorus compounds, OH number 86 mg KOH/g (Lupragen ® VP 9270, BASF), |
| 10 parts | of flame retardant based on a chlorine- and bromine-containing polyetherol, OH-number 330 mg KOH/g (IXOL B 251, Solvay) |
| 0.5 part | of silicone stabilizer Tegostab B 8466, Goldschmidt, |
| 0.5 part | of stabilizer OS 340, Bayer AG, |
| 2.3 parts | of catalyst KX 315, Elastogran GmbH, |
| 2.36 parts | of water and |
| 1.24 parts | of dipropylene glycol | was reacted with 140.2 parts of Lupranat® M 50 (BASF), a mixture of diphenylmethane diisocyanates and polyphenylpolymethylene polyisocyanates having a viscosity of 520 mPas at 25° C., an NCO content of 30.5% by weight and a two-ring content of 32% by weight.

The following measured values were obtained in free foaming:

| | |
|---|---|
| Pot life in s | 18 |
| Fiber time in s | 58 |
| Foam density free, in kg/m$^3$ | 49 |
| Indentation test, values in N | |
| 3 min | 37.5 |
| 5 min | 86.9 |

The indentation test is a measure of curing in the known cup test. After the indicated time after mixing, a hemispherical indentor having a radius of 10 mm is pressed into the surface of the freshly formed foam head and the maximum force produced is measured.

Production of Rigid Foam Moldings, Characterization of Crack Formation 100 parts by mass of the A component mixture were mixed with the polyisocyanate in the mixing ratio indicated in the formulations. Mixing was carried out using a laboratory stirrer. 576 g of this mixture of A component and isocyanate were, immediately after mixing, poured into a mold having dimensions of 300 mm×400 mm×80 mm which was at 45° C. and the mold was subsequently closed tightly. The overall density of the molding was then 60+/−1 kg/m$^3$. The molding was removed from the mold for 2.5 minutes and stored for 24 hours at room temperature, subsequently sawn centrally along the 400 mm length and examined for crack formation. The assessment was carried out visually and was recorded on a scale of 1:1 by means of a photocopier. Using a ruler, the mean crack width on the copies was measured as the mean of measurements at 5 fixed points (at 100, 150, 200, 250 and 300 mm) along the 400 mm length.

Result: a crack width of 2.4 mm was found.

Curing in the Interior of the Foam

To determine curing in the core, the compressed strength is measured 6 minutes after mixing. 100 mm×100 mm×150 mm specimens were cut 3 minutes after the commencement of mixing from a foam produced in a 150 mm×150 mm×150 mm wooden mold which was open at the top and was provided with vertical guide slots and the specimens were left in the mold. 6 minutes after the commencement of mixing, these specimens were tested in a compressive test at 80 mm/min. The compressive force at the first maximum is a measure of the after-curing in the core.

Result: compressive strength after 6 minutes in N/dm$^2$ 1015

EXAMPLE 2 ACCORDING TO THE PRESENT INVENTION

Preparation of the Prepolymer 97.9 parts by mass of Lupranat® M 20 (BASF) having a higher proportion of diphenylmethane diisocyanates (42% by weight) and a correspondingly lower proportion of polyphenylpolymethylene polyisocyanates and characterized by a viscosity of 190 mPas at 25° C., were reacted at 80° C. with 2.1 parts by mass of a polyetherol derived from sorbitol, propylene oxide and water, OH number 489 mg KOH/g (Lupranol® 3422, BASF) for 1 hour. The resulting prepolymer had a viscosity of 537 mPas at 25° C., and the NCO content was 30.7% by weight.

The A component of Example 1 was reacted with this prepolymer according to the present invention instead of with Lupranat® M 50 in exactly the same ratios. The measurement methods corresponded to those in Example 1.

Results:

| | |
|---|---|
| Pot life in s | 18 |
| Fiber time in s | 59 |
| Foam density, free, in kg/m³ | 49.9 |
| Indentation test, values in N | |
| 3 min | 39.4 |
| 5 min | 94.3 |
| Crack width in mm | 1.9 |
| Compressive strength after 6 minutes in N/dm² | 1189 |

EXAMPLE 3 COMPARISON

The A component from Example 1 was reacted with 125.1 parts by mass of Lupranat® M 50, a mixture of diphenylmethane diisocyanates and polyphenylpolymethylene polyisocyanates having a reduced viscosity of 391 mPas at 25° C., an NCO content of 31.8% by weight and a two-ring content of 42% by weight.

Results:

| | |
|---|---|
| Pot life in s | 18 |
| Fiber time in s | 58 |
| Foam density, free, in kg/m³ | 48.5 |
| Crack width in mm | 5.1 |
| Compressive strength after 6 minutes in N/dm² | 1081 |

EXAMPLE 4 ACCORDING TO THE PRESENT INVENTION

Preparation of the Prepolymer 99.6 parts by mass of Lupranat® M 50 as in Example 3 were reacted at 80° C. with 0.4 part by mass of a polyetherol derived from sorbitol, propylene oxide and water (Lupranol® 3422) for 1 hour. The resulting prepolymer had a viscosity of 537 mPas at 25° C., and the NCO content was 31.5% by weight.

The A component of Example 1 was reacted with this prepolymer according to the present invention instead of with Lupranat® M 50 as in Example 3 in exactly the same ratios. The measurement methods corresponded to those in Example 1.

Results:

| | |
|---|---|
| Pot life in s | 17 |
| Fiber time in s | 57 |
| Foam density, free, in kg/m³ | 49.5 |
| Crack width in mm | 2.1 |
| Compressive strength after 6 minutes in N/dm² | 1220 |

EXAMPLE 5

A polyol based on sorbitol and propylene oxide and having an OH number of 490 mg KOH/g (Lupranol® 3422, BASF) was metered continuously at a rate of 2.5 kg/min via a static mixer into a Lupranat® M10 process stream which was flowing at a rate of 97.5 kg/min and was at a temperature of 80° C. To complete the reaction, the mixture was fed into a storage container in which it was circulated by means of a circulating pump.

The resulting prepolymer had an NCO content of 30.2% by weight and a viscosity of 390 mPas at 25° C.

Lupranat® M 10 (BASF) is a mixture of diphenylmethane diisocyanates and polyphenylpolymethylene polyisocyanates having a viscosity of 115 mPas and a two-ring content of 48% by weight.

A customary prepolymer formulation containing (parts=parts by mass):

| | |
|---|---|
| 90.85 parts | of a polyetherol based on propylene glycol, propylene oxide and ethylene oxide, OH number 29 mg KOH/g (Lupranol ®2043, BASF), |
| 3 parts | of a polyetherol based on glycerol, propylene oxide and ethylene oxide, OH number 42 mg KOH/g (Lupranol ®2047, BASF), |
| 1 part | of glycerol, |
| 0.9 part | of diethanolamine, |
| 0.3 part | of stabilizer Tegostab B 4113 (Goldschmidt), |
| 0.45 part | of amine catalyst mixture and |
| 3.5 parts | of water, |
| mixed with | |
| 26.5 parts | of tolylene diisocyanate (Lupranat ®T 80, BASF) and |
| 26.5 parts | of the prepolymer described | gave a flexible foam having a fine-celled structure.

EXAMPLE 6 COMPARISON

Using a customary double conveyor belt, the following rigid polyurethane foam system using water alone as blowing agent is processed to produce sandwich elements having steel outer layers:

A Component

| | |
|---|---|
| 52.5 | parts of Lupranol ® 3321, |
| 7 | parts of Lupranol ® 3423, |
| 13 | parts of trichloropropyl phosphate, |
| 14 | parts of Lupragen ® VP 9270, |
| 3.5 | parts of diethyl ethylphosphonate, |
| 8.5 | parts of flame retardant IXOL B 251, |
| 2.06 | parts of water, |
| 1.0 | part of stabilizer Tegostab B 8466, |
| 2.3 | parts of catalyst KX 315 and |
| 1.04 | parts of dipropylene glycol |

B Component 123 parts of Lupranat® M50 as in Example 1

The A and B components were reacted in a machine.

The mass flows were 7768 g/min of A component and 9108 g/min of B component.

The curing of the foam was not satisfactory. Cracks were formed on sawing at the transverse cutter for cutting the elements to length.

EXAMPLE 7 ACCORDING TO THE PRESENT INVENTION

The procedure of Example 6 was repeated using 123 parts by mass of the prepolymer of Example 4 as B component in place of 123 parts by mass of Lupranat® M50.

Curing of the foam was good. No cracks were formed on sawing at the transverse cutter for cutting the elements to length.

We claim:

1. A prepolymer containing isocyanate groups, having an NCO content of at least 30.0% by weight comprising a reaction product of an isocyanate mixture of diphenylmethane diisocyanates and polyphenylpolymethylene polyisocyanates and having a proportion of two-ring isomers of from 25% to 70% by weight based on the total weight of said isocyanate mixture and an at least 4-functional polyol or a mixture of polyols having a mean functionality of at least 4, where the polyol or polyol mixture has a hydroxyl number of from 200 to 1,650 mg KOH/g and a number average molecular weight of less than 1100 g/mol.

2. A prepolymer containing isocyanate groups as claimed in claim 1, wherein the polyol or polyol mixture has a hydroxyl number of from 300 to 1000 mg KOH/g.

3. A prepolymer containing isocyanate groups as claimed in claim 1, wherein the polyol or polyol mixture has a number average molecular weight of from 280 to 1000 g/mol.

4. A prepolymer containing isocyanate groups as claimed in any of claims 1 to 3, wherein the polyol used is a polyetherol.

5. A prepolymer containing isocyanate groups as claimed in claim 1, wherein the polyol used is a reaction product of sorbitol, propylene oxide and water and has a hydroxyl number of from 200 to 800 mg KOH/g.

6. A prepolymer containing isocyanate groups as claimed in claim 1, wherein the reaction of the isocyanate mixture with the polyol or the polyol mixture is carried out by metering the polyol or the polyol mixture directly into a process stream and/or an isocyanate container of an isocyanate-producing plant.

7. A prepolymer containing isocyanate groups as claimed in claim 1, wherein, in addition to the polyol or polyol mixture, further organic isocyanates other than said isocyanate mixture are metered into a process stream and/or an isocyanate container of an isocyanate-producing plant.

8. A process for preparing prepolymers containing isocyanate groups comprising reacting an isocyanate mixture of diphenylmethane diisocyanates and polyphenylpolymethylene polyisocyanates and having a proportion of two-ring isomers of 25% to 70% by weight based on the total weight of said isocyanate mixture with an at least 4-functional polyol or a mixture of polyols having a mean functionality of at least 4, where the polyol or polyol mixture has a hydroxyl number of from 200 to 1650 mg KOH/g and a number average molecular weight of from 136 to 1090 g/mol.

9. A process as claimed in claim 8, wherein the reaction to form the prepolymer is carried out by metering the polyol or the polyol mixture directly into a process stream and/or an isocyanate container of an isocyanate-producing plant.

10. A process as claimed in claim 9, wherein the polyol or polyol mixture is metered in continuously and/or discontinuously.

11. A process as claimed in claim 8, wherein a reaction temperature of from 20 to 100° C. is maintained.

12. A process as claimed in claim 8, wherein the polyol or polyol mixture is used in an amount of from 0.1 to 5% by weight, based on the total weight of the prepolymer.

13. A process as claimed in claim 8, wherein, in addition to the polyol or polyol mixture, further additional organic isocyanates other than said isocyanate mixture are metered into a process stream and/or an isocyanate container of an isocyanate-producing plant.

14. A process for producing polyurethanes comprising reacting at least one prepolymer containing isocyanate groups, optionally in admixture with further organic and/or modified organic isocyanates (a), with compounds containing at least two reactive hydrogen atoms (b) optionally in the presence of blowing agents (c), catalysts (d) and further auxiliaries and/or additives (e), wherein the prepolymers containing isocyanate groups are those claimed in claim 1.

* * * * *